June 22, 1971
E. D. GUTH ET AL
3,586,732
PROCESS FOR PREPARING OLEFINS AND THE APPARATUS THEREFOR
Filed June 27, 1969
2 Sheets-Sheet 1

Eugene D. Guth
Jerry L. Lewis
Leslie J. Van Nice
*INVENTORS*

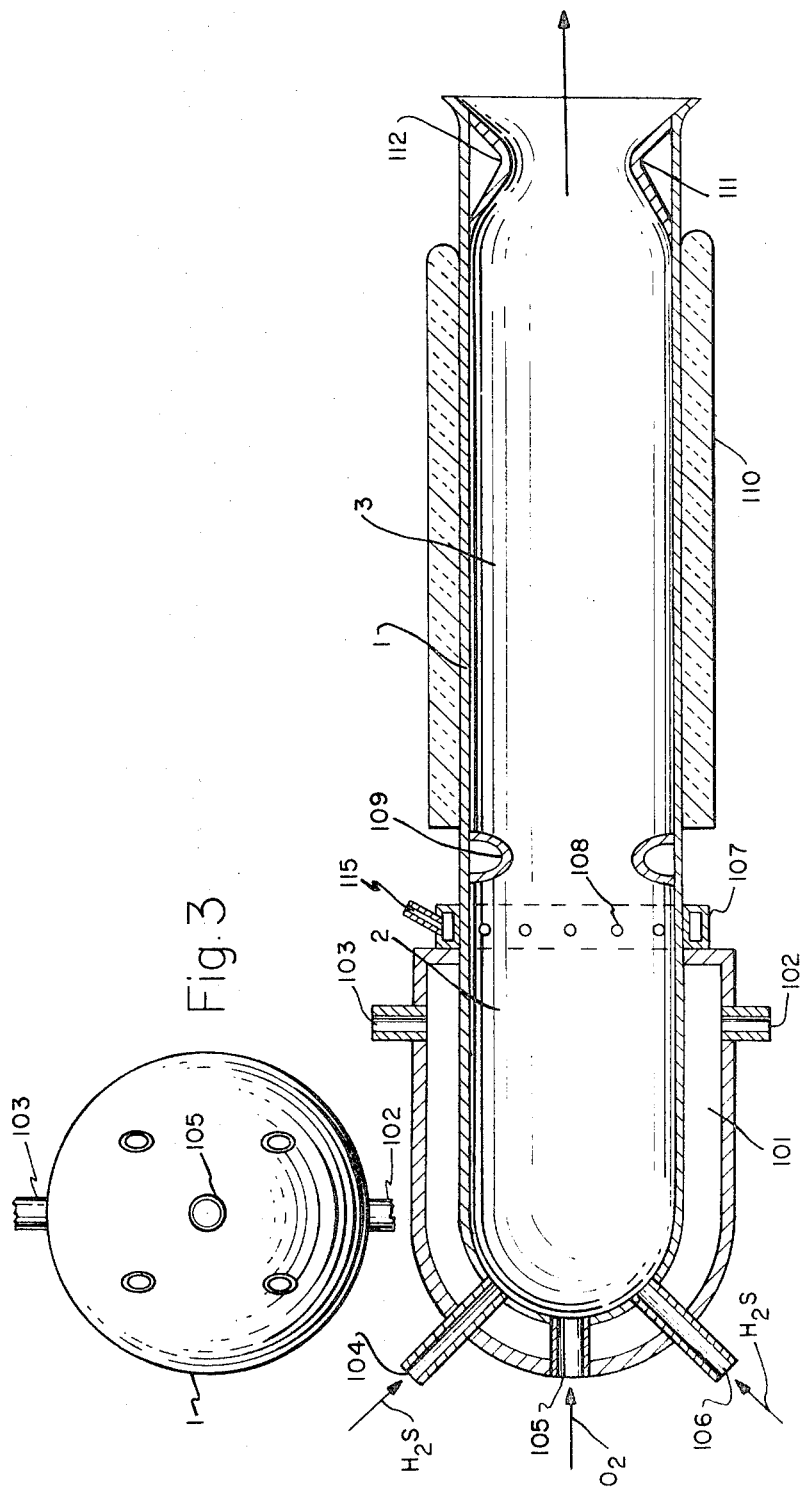

United States Patent Office 3,586,732
Patented June 22, 1971

3,586,732
PROCESS FOR PREPARING OLEFINS AND THE
APPARATUS THEREFOR
Eugene D. Guth, Palos Verdes Estates, Jerry L. Lewis, Cypress, and Leslie J. Van Nice, Manhattan Beach, Calif., assignors to TRW Inc., Redondo Beach, Calif.
Filed June 27, 1969, Ser. No. 837,250
Int. Cl. C07c 3/00, 5/18
U.S. Cl. 260—683.3
35 Claims

ABSTRACT OF THE DISCLOSURE

This invention relates to a continuous process for preparing an olefin product comprising prevailing amounts of propylene and the apparatus therefor under substantially adiabatic conditions. Specifically, the process comprises the oxidation of at least one sulfur-containing compound e.g. hydrogen sulfide in the oxidation-reaction zone of a substantially adiabatic reactor, at temperatures ranging up to about 4500° F. and at pressures ranging up to about 1500 p.s.i.a. The oxidation-reaction products passing from the oxidation-reaction zone of said reactor are brought in direct contact and mixed with hydrocarbons containing a substantial amount of propane. The propane is converted to propylene in the dehydrogenation-reaction zone of the same reactor. The dehydrogenation of the propane is carried out in the presence of the oxidation-reaction products at mixing temperatures which may range up to about 4500° F., at pressures ranging up to about 1400 p.s.i.a. and for a contact or reaction timer ranging up to about 60 seconds. The reactor wherein the reactions take place comprises a substantially cylindrical vessel having a plurality of reaction zones. The first of said reaction zones comprises means for receiving combustible materials and is substantially surrounded by a coolant. The second of said reaction zones is insulated and has means for controlling the relative pressures between the first and second zones. The reactor has on its outer periphery means for carrying hydrocarbons into the area of the dehydrogenation zone wherein said hydrocarbons are converted to olefins.

---

This invention is directed to a continuous process for preparing an olefin product comprising a prevailing amount of propylene and more particularly to a process wherein propane or a propane-containing stream is converted to propylene under substantially adiabatic conditions at comparatively high temperatures and pressures in a multi-zone reactor. More specifically, this invention relates to a continuous process for converting hydrocarbons to an olefin product comprising ethylene and propylene in prevailing amounts by carrying out the process in a substantially adiabatic reactor in the presence of sulfur-containing compounds. Still more specifically, this invention relates to a continuous process for preparing propylene by utilizing a multi-zone adiabatic reactor wherein an oxygen containing stream or its equivalent e.g. oxygen is reacted in an oxidation-reaction zone with at least one sulfur compound e.g. hydrogen sulfide at temperatures ranging up to about 4500° F. and at pressures ranging up to about 1500 p.s.i.a. The reaction products formed in the oxidation-reaction zone of the reactor are subsequently contacted and mixed with propane or its equivalent in the dehydrogenation zone wherein said propane is converted to an effluent stream containing ethylene and propylene in high yields.

The use of olefins, in general, is increasing and particularly propylene is being used for a variety of purposes in the various industries including, for example, the petroleum, pharmaceutical, petrochemical and the plastic industry. With the present technology, which relies on thermal dehydrogenation of the hydrocarbon, gaseous mixtures are obtained which comprise ethylene and propylene in ratios of approximately 2:1, respectively. This however, is not sufficient to supply the amount of propylene required for present and future needs without exceeding the projected needs of ethylene. Moreover, in thermally converting the hydrocarbon to its corresponding olefin, comparatively high-temperatures are required which have a tendency to crack the hydrocarbon and thereby result in an undesirable yield of the lower molecular weight compounds. Attempts, however, to prepare olefins at lower temperatures, to avoid any appreciable amount of deleterious cracking resulted in little or no conversion of the hydrocarbon unless relatively lower temperatures were used in the presence of a catalyst. Thus, in accordance with present technology, dehydrogenation may be carried out at lower temperatures if a suitable catalyst were employed together with the more complicated and expensive apparatus. This, however, may require operating not only under conditions below atmospheric pressure for example, but also requires the use of additional equipment and cost for regenerating the catalyst, etc. Therefore, it has become necessary to find a dehydrogenating process whereby propane, for example, can be converted to propylene with less complicated and expensive apparatus and where the propylene is formed in preference to the other materials e.g. methane, ethylene, carbon, etc.

Consequently, to avoid these problems and to provide a novel process for selectively preparing olefins, it has been found that an olefin product comprising prevailing amounts of propylene can be obtained under substantially adiabatic conditions. The process comprises reacting a sulfur-containing compound e.g. hydrogen sulfide with an oxygen-containing stream e.g. oxygen at temperatures ranging up to about 4500° F. and at pressures ranging up to about 1500 p.s.i.a The reaction products obtained from the oxidation of the sulfur-containing compound, under critical conditions, are brought into contact and mixed with the hydrocarbon stream e.g. propane at temperatures ranging up to about 4500° F., and at pressures ranging up to about 1400 p.s.i.a for a period or contact time ranging up to about 60 seconds.

Therefore, it is an object of this invention to provide a continuous process and the apparatus therefor wherein an olefin product comprising prevailing amounts of propylene can be obtained under substantially adiabatic conditions in a single multi-zone reactor.

It is another object of this invention to provide a continuous process and the apparatus therefor wherein a light-hydrocarbon stream containing prevailing amounts of propane may be converted in the dehydrogenation-reaction zone to propylene in high yields.

It is still another object of this invention to provide a process for preparing polymer-grade propylene by dehydrogenating substantially pure propane with oxidation-reaction products obtained by oxidizing, a sulfur compound e.g. hydrogen sulfide at temperatures ranging up to about 4500° F.

It is still a further object of this invention to provide an apparatus for continuously preparing an olefin product comprising prevailing amounts of propylene, under substantially adiabatic condition, which comprises a multi-zone reactor wherein sulfur-containing compounds are oxidized at substantially high temperatures to form intermediate reaction products which dehydrogenate propane to propylene.

It is still a further object of this invention to provide a continuous process for preparing an olefin product comprising prevailing amounts of propylene and the apparatus therefor wherein, under substantaially adiabatic conditions, an oxygen-containing stream is reacted with at least one sulfur compound at comparatively high temperatures in an oxidation-reaction zone to form reaction products which when brought into contact with a light-hydrocarbon stream, in the presence of a catalyst, converts said hydrocarbon to propylene.

It is still a further object of this invention to provide a continuous process and the apparatus therefor for preparing a gaseous olefin product comprising prevailing amounts of propylene, under substantially adiabatic conditions, with or without the presence of a metal catalyst.

These and other objects of the invention will become apparent from a further and more detailed description as follows.

More specifically, it has been found that high yields of propylene in combination with ethylene can be obtained in a continuous process under substantially adiabatic conditions. The process comprises the use of a single multi-zone reactor from which is obtained an olefin product stream containing prevailing amounts of propylene. The reactor comprises an oxidation-reaction zone wherein an effective amount of at least one sulfur compound e.g. hydrogen sulfide is reacted with an oxygen-containing stream e.g. substantially pure oxygen at a ratio of about 0.2–1.0 part by weight of the oxygen in said oxygen-containing stream to about 1.0 part by weight of the sulfur compound. The reaction of the oxygen-containing stream and the sulfur compound takes place at high temperatures ranging from about 2500° F. to 4500° F. and more preferably at temperatures ranging from about 3200° to 3800° F. The pressure in the oxidation-reaction zone, at these temperatures, may range from about 20 to 1500 p.s.i.a. and preferably between 60 to 1000 p.s.i.a. and a still more preferred range of between 200 and 600 p.s.i.a. The contact time or period of reaction between the oxygen-containing stream and the sulfur compound is at least 0.001 second and preferably ranges from about 0.001 to 0.05 second. The precise reaction time, however, will depend on the particular reactants, the temperature and pressure utilized in the oxidation-reaction zone.

The sulfur compound may be selected from the group consisting of hydrogen sulfide, mixtures of hydrogen sulfide and carbon disulfide and mixtures of hydrogen sulfide with a sulfur oxide e.g. $SO_2$ and/or $SO_3$ wherein said hydrogen sulfide is present in said mixtures in an amount of at least 50% by weight. In addition, if needed, small amounts of elemental sulfur may be used in combination with the hydrogen sulfide, carbon disulfide, the sulfur oxides and mixtures thereof in amounts ranging up to about 25% by weight of the mixtures. Thus, it is possible for purposes of this invention to utilize not only substantially pure hydrogen sulfide as the preferred sulfur compound but also mixtures of hydrogen sulfide with various chemical equivalents including sulfur, carbon disulfide and the sulfur oxides so long as said hydrogen sulfide is present in any of the mixtures in an amount of at least 50% by weight.

The effluent comprising the oxidation-reaction products exiting from the oxidation-reaction zone is carried directly to the dehydrogenation zone of the same reactor wherein said oxidation-reaction products are brought into contact and mixed with a light-hydrocarbon stream containing at least 50% by weight of propane. The light-hydrocarbon stream may comprise anywhere from 50 to 100% of propane with 0 to 50% by weight of ethane but should be substantially free of any olefins and hydrocarbons having four or more carbon atoms. The hydrocarbon stream e.g. substantially pure propane is brought into contact and mixed with the oxidation-reaction products e.g. reaction products of $H_2S$ and $O_2$ in an amount of approximately 0.05–1.5 parts by weight of the oxygen in the oxygen-containing stream added to the oxidation-reaction zone per 1.0 part by weight of the propane in the hydrocarbon stream added to the dehydrogenation-reaction zone.

The oxidation-reaction products are brought into contact and thoroughly mixed with the propane, for example, at temperatures ranging from about 1600° to 4500° F. and more preferably at temperatures ranging from about 1600° to 3800° F., at pressures ranging from about 14 to 1400 p.s.i.a. and more preferably at pressures ranging from 150 to 400 p.s.i.a. At these temperatures, it is important that the reaction or contact time of the propane with the oxidation-reaction products, in the dehydrogenation zone, range from about 0.001 to 60 seconds and more preferably from 0.01 to 1.0 seconds. More specifically, the temperature at which the hydrocarbon stream e.g. propane gas is mixed with the oxidation-reaction products is inversely related to the contact or reaction time. Thus, for example, where the hydrocarbon stream is mixed with the oxidation-reaction products at the higher-end of the dehydrogenation reaction temperature range e.g. 3200° to 4500° F. the contact time of said hydrocarbon stream with the oxidation-reaction products may be at the lower-end of he range e.g. 0.001 to 1.0 second; whereas, if the hydrocarbon stream i.e. propane is mixed with the oxidation-reaction products at the lower-end of the dehydrogenation-reaction temperature range e.g. 1600° to 3200° F. then the contact time may be up at the higher end of the range e.g. ranging from 1.0 to 60 seconds. One of the reasons why the hydrocarbon stream can be mixed with the oxidation-reaction products passing from the oxidation-reaction zone at such high temperatures e.g. ranging up to 4500° F. without any appreciable amount of cracking is because of the short period of time in which said hydrocarbons are in contact with the oxidation-reaction products e.g. contact times as low as 0.001 seconds. It is also important, however, that the temperature in or throughout the dehydrogenation zone be maintained at least above 1000° F. and may range up to the reaction temperature of about 4500° F. It was unexpected to find that propane, for example, could be mixed with the oxidation-reaction products at these high temperatures without any appreciable amount of cracking. The reason is believed to be due to the rapid rate of mixing which permits dehydrogenation to occur before cracking. Thus, it is important that the mixing or contact time between the hydrocarbon stream and the oxidation-reaction products be correlated with the dehydrogenation temperatures employed. The effluent exiting from the dehydrogenation-reaction zone contains ethylene and propylene as the major olefin product together with hydrogen sulfide, unreacted propane, water and minor amounts of other constituents including, for example, carbon disulfide, methane, ethane, $CO_2$, CO, etc. The dehydrogenation-reaction effluent is separated to provide recycled streams, one of which comprises sulfur compounds e.g. hydrogen sulfide, etc., and another which comprises small amount of unreacted propane, etc. These streams may be recycled while the olefin stream comprising ethylene and prevailing amounts of propylene, e.g. amounts in excess of about 40% is obtained as the major product.

The apparatus utilized in carrying out the process of this invention comprises a substantially adiabatic reactor wherein the sulfur compound e.g. hydrogen sulfide is reacted with oxygen under substantially high pressures and temperatures. Typical dehydrogenation reactions are highly endothermic and require large amounts of heat to convert the hydrocarbon to its corresponding olefin. In accordance with the process of this invention the need for expensive reaction furnaces to supply heat is eliminated because the heat generated in the oxidation-reaction zone is recovered in the dehydrogenation zone together with the oxidation-reaction products. Thus, it has been found that by carrying out the dehydrogenation process in a single multi-zone reactor under the conditions set forth, it is possible to carry out the process under substantially adiabatic conditions by balancing the endothermic dehydrogenation reaction with the exothermic oxidation-reaction. It is also the design of the adiabatic reactor which allows the process to be carried out in a continuous manner, in a single reactor, under the reaction conditions required to achieve a maximum degree of selectivity and a high conversion of propane to propylene.

It is well known, for example, that hydrogen sulfide may be converted to elemental sulfur by burning the gas with restricted amounts of air and/or oxygen in a two-stage reactor in accordance with the following equations:

(1) $H_2S + \frac{3}{2}O_2 \rightarrow SO_2 + H_2O$ (2) $2H_2S + SO_2 \rightarrow 3S + 2H_2O$ The first of the above reactions ordinarily takes place in a furnace while the second takes place in a converter in the presence of a catalyst. Good yields of sulfur are obtained from the process by close control of the temperature and removal of the exothermic heat of reaction. However, to improve the yield and to avoid the use of a two-stage reactor wherein a catalyst is generally needed in the second stage, it has been found that by utilizing temperatures ranging up to about 4500° F., hydrogen sulfide or its chemical equivalent can be oxidized, under critical conditions, to obtain oxidation-reaction products which are useful to convert a hydrocarbon to its corresponding olefin. The conversion takes place in a dehydrogenating-reaction zone under specified conditions to obtain good selectivity and a high percentage of conversion per pass. Although it is not completely understood, it is believed that it is the synergistic action of the products obtained from the oxidation of the sulfur compound in the oxidation-reaction zone together with the exothermic heat of reaction which enables the process to operate in a continuous manner with high yields of propylene. Thus, the conversion of propane to propylene is due not only to the reaction conditions, e.g. time and temperatures but more important to the products obtained from the oxidation-reaction zone which synergistically convert the hydrocarbon to its corresponding olefin.

To avoid many of the disadvantages which normally accompany processes wherein sulfur-containing compounds are reacted with oxygen in an ex situ apparatus, it has been found that by utilizing a single multizone reactor it is possible to obtain propylene, in high yields, by reacting in the oxidation-reaction zone of said reactor at least one sulfur compound with an oxygen-containing stream at a ratio of about 0.2–1.0 part by weight of the oxygen in said oxygen-containing stream to 1.0 part by weight of the sulfur compound. More specifically, when substantially pure hydrogen sulfide is employed, the ratios range from about 0.3–0.7 to 1 and preferably in amounts ranging from about 0.4–0.5 and 0.2–0.6 part by weight of the oxygen in the oxygen-containing stream to 1.0 part by weight of the sulfur compound. The precise ratio of the oxygen to the sulfur compound will depend, however on the composition of the oxygen-containing stream and the particular sulfur-containing compound utilized. Thus, for example, in instances where substantial pure oxygen is used as the oxygen-containing stream for reaction with hydrogen sulfide the ratio of oxygen is preferably between 0.42 to 0.48 part by weight of oxygen per part by weight of hydrogen sulfide.

One of the critical features of the process is the employment of temperatures which are sufficiently high to obtain in a single-step reaction substantially, complete combustion of the hydrogen sulfide. These temperatures range from about 2500° F. to 4500° F. and more preferably from about 3200° F. to 4000° F. The pressures range from about 20 to 1500 p.s.i.a., preferably from 60 to 1000 p.s.i.a. and more preferably from 200 to 600 p.s.i.a. Where hydrogen sulfide is reacted, for example, with substantial pure oxygen in the oxidation-reaction zone, it is preferred to utilize temperatures ranging between 3200° and 3800° F. at pressures ranging from about 200 to 600 p.s.i.a. for a contact time ranging up to about 0.2 second. Again however, the reaction time will vary depending on the particular sulfur compound and oxygen-containing stream utilized in the oxidation-reaction zone. Thus, where substantially pure oxygen is reacted with hydrogen sulfide for example, the reaction time in the oxidation-reaction zone may range from about 0.001 to 0.1 and preferably from 0.001 to 0.05 second.

The sulfur compound reacted with the oxygen in the oxidation-reaction zone is preferably hydrogen sulfide but other combinations of hydrogen sulfide with sulfur, carbon disulfide and/or sulfur oxides may be utilized without any difficulty. More specifically, the sulfur compound may be selected from the group consisting of hydrogen sulfide, mixtures of hydrogen sulfide with carbon disulfide and mixtures of hydrogen sulfides with a sulfur oxide e.g. $SO_2$ and/or $SO_3$ wherein the hydrogen sulfide is present in said mixtures in an amount of at least 50% by weight. It may be desirable, in some instances, to add elemental sulfur to the hydrogen sulfide and mixtures of hydrogen sulfide with carbon disulfide and/or the sulfur oxides in amounts ranging up to about 25% and more preferably in amounts ranging up to about 10% of the total mixture. Likewise, various oxygen-containing streams may be utilized, however, the preferred includes substantially pure oxygen or air and various mixtures thereof depending upon the reaction temperatures, contact time and pressures utilized in the oxidation-reaction zone. The sulfur containing compound e.g. hydrogen sulfide may be either in the form of a gas and/or liquid. Similarly, the oxygen-containing stream e.g. oxygen may be in the form of a liquid and/or gas depending upon the particular form of the sulfur compound and the reaction conditions in the oxidation-reaction zone.

The effluent exiting from the oxidation-reaction zone of the reactor contains the oxidation-reaction products including sulfur, water, carbon dioxide, hydrogen sulfide, and various other products depending upon the composition of the sulfur-containing compound. The effluent passes directly from the oxidation-reaction zone of the reactor and is brought into contact and thoroughly mixed with a light-hydrocarbon stream in the dehydrogenation zone at comparatively high temperatures. More specifically, the light-hydrocarbon stream should contain at least 50% by weight of propane and be substantially free of olefins and hydrocarbons having four or more carbon atoms per molecule. In other words, it is possible to utilize commercially available hydrocarbon streams so long as they contain at least 50% by weight of propane and preferably up to 99% by weight of propane with lesser amounts of ethane and substantially no olefins and hydrocarbons of four or more carbon atoms. The preferred hydrocarbon, however, is substantially pure propane with small amounts of ethane and still smaller amounts of other higher molecular weight hydrocarbons or olefins e.g. amounts less than about 10% by weight. The amount of hydrocarbon entering the dehydrogenation-reaction zone coming in contact and being mixed with the oxidation-reaction products exiting from the oxidation-reaction zone will vary depending upon the initial reactants i.e. the hydrogen sulfide and oxygen reacted in the oxidation-reaction zone of the reactor.

Specifically, the amount of light-hydrocarbon stream, depending upon the amount of propane gas contained therein, brought into contact and mixed with the oxidation-reaction products in the dehydrogenation-reaction zone ranges from about 0.05–1.5 parts by weight of the oxygen contained in the oxygen-containing stream added to the oxidation-reaction zone per 1.0 part by weight of propane added to the dehydrogenation-reaction zone. Preferably, the total mass flow of the oxygen and hydrocarbon ranges from about 0.1 to 0.8 part by weight of oxygen in the oxygen-containing stream added to the oxidation-reaction zone per 1.0 part by weight of propane in the hydrocarbon stream added to the dehydrogenation-reaction zone. More specifically, for example, where substantially pure oxygen is utilized, the amount of oxygen added to the oxidation-reaction zone ranges from about 0.2–0.6 part by weight of oxygen to 1.0 part by weight of propane added to the dehydrogenation zone of the reactor.

The effluent exiting from the oxidation-reaction zone containing the oxidation-reaction products e.g. sulfur, water, $CO_2$, etc., are brought into contact and thoroughly mixed with the hydrocarbon stream e.g. propane gas at mixture temperatures ranging from about 1600° to 4500° F., e.g., 2000° to 3800° F. and more likely at temperatures ranging from about 1600° to 4000° F. with pressures ranging from about 14 to 1400 p.s.i.a. Preferably, propane is mixed with the oxidation-reaction products entering the dehydrogenation-reaction zone at mixture temperatures ranging between 1600° to 3800° F., at pressures ranging from about 40 to 900 p.s.i.a., e.g., 100 to 300 p.s.i.a. and more preferably at pressures ranging from about 150 to 400 p.s.i.a. The propane may remain in contact with the oxidation-reaction products, in the dehydrogenation zone, for periods of time ranging from about 0.001 to 60 seconds and preferably for periods ranging from about 0.01 to 1.0 second depending on the temperatures to obtain an olefin product comprising ethylene and propylene wherein propylene is present in prevailing amounts. Where the light-hydrocarbon streams consist essentially of propane gas; said propane may be in contact with the oxidation-reaction products, obtained from the oxidation-reaction zone, at temperatures ranging from about 1600° to 4000° F., at pressures ranging from about 200 to 300 p.s.i.a., and for a contact time ranging from about 0.005 to 0.5 second. In addition, the average temperature throughout or in the dehydrogenation zone of the reactor should be maintained at least above 1000° F. but it may range up to the oxidation-reaction temperatures.

The effluent exiting from the dehydrogenation-reaction zone is continuously being separated by known methods into the various streams. The stream comprising the sulfur compounds e.g. sulfur, carbon disulfide, hydrogen sulfide, etc., may be recycled to the oxidation-reaction zone while the stream containing any unreacted propane etc., is recycled to the dehydrogenation-zone. The olefins stream separated from the effluent comprising ethylene and prevailing amounts of propylene is further separated and passed to storage.

While the process of this invention may be carried out in the apparatus described herein with complete satisfaction, it may be desirable in some instances to utilize a dehydrogenation catalyst for the conversion of the hydrocarbon to its corresponding olefin. More specifically, the catalyst may include a metal or metal compound which is substantially solid at the reaction temperatures. The metals particularly useful are found in Groups I through VIII of the Periodic Table. The metals either in their elemental form or as oxides, hydroxides or salts, etc., may be used either alone or on a support. The catalyst may include, for example, the metal oxides, metal hydroxides, metal nitrates, carbonates, nitrites, acetates, sulfides, silicates, sulfites, formates, and various other known metal salts of the lower molecular weight organic acids. As stated, these metals or metal compounds may be deposited on a catalyst support e.g. alumina by any of the well-known methods. The metal and metal compounds which are preferred for purposes of this invention, include cerium, nickel, manganese, the noble metals e.g. platinum and various mixtures of these metals either alone or in combination with their metal salts. Typical examples of the catalyst include the nickel compounds such as the oxides, hydroxides, halides, phosphates e.g. nickel chloride, nickel oxide, nickel fluoride, nickel sulfate, etc. In addition, other specific examples include ceric oxide, cerous acetate, cerous carbonate, cerous chloride, cerous sulfate, etc. The noble metals of Group VIII are particularly preferred as a catalyst and may include platinum, palladium, rhodium, osmium, ruthenium, iridium and various mixtures thereof such as platinum-rhodium, etc.

As stated, in the event a catalyst is used, the catalyst composition may comprise in addition to the catalytic material an inorganic carrier or support. These supports are intimate combinations of the catalyst or mixtures of the catalysts either as a free metal or the metal salt in combination with the support. In some instances, catalytic binding agents or fillers may be utilized but are not generally used in amounts exceeding 40% by weight of the total catalytic composition. The amount of catalyst surface is generally at least 0.01 square meter of catalyst surface per gram of catalyst. The catalysts are more effectively utilized when the surface area is at least 75 square meters per gram. The ratio of catalyst to reaction zone will depend, however, upon various factors including particle distribution, bulk density, bulk particle size, the amount of catalyst present on the carrier, the density of said carrier, etc. Where a carrier is needed, the catalyst may be deposited on said carrier by methods well-known in the art including the use of aqueous solutions or dispersions. For example, the carrier may be impregnated with a solution of the catalyst and the solvent is removed leaving the catalyst on said carrier in amounts ranging from about 0.05 to 75% by weight of the total composition e.g. active catalyst material plus the carrier or support.

There are various catalyst supports some of which include for example, the zeolite materials, both the natural and synthetic which have demonstrated to have catalytic capabilities. These may be further characterized as crystalline alumina-silicates of definite crystalline structure containing cavities of defined sizes and therefore capable of absorbing molecules of certain dimensions while rejecting others. These materials are generally known as molecular sieves and may be utilized in a variety of ways to take advantage of their physical characteristics. Other well-known carriers include, for example, silica, carborundum, pumice, alumina, asbestos, and the like.

The following are specific examples which illustrate the process in accordance with this invention.

| Example | 1 | 2 | 3 | 4 |
|---|---|---|---|---|
| Oxygen feed, (parts by wt.) lb./sec | 0.12 | 0.11 | 0.28 | 0.49 |
| Hydrogen sulfide feed, lb./sec | 0.22 | 0.25 | 0.63 | 1.15 |
| Propane feed, lb./sec | 0.66 | 0.65 | 1.09 | 1.36 |
| T oxidation-reaction zone, °F | 3,800 | 3,500 | 3,600 | 3,500 |
| P oxidation-reaction zone, p.s.i.a | 325 | 345 | 310 | 370 |
| T dehydrogenation-reaction zone, °F | 1,280 | 1,200 | 1,210 | 1,310 |
| P dehydrogenation-reaction zone, p.s.i.a | 100 | 210 | 150 | 250 |
| Residence time, dehydrogenation-reaction zone, seconds | 0.62 | 0.60 | 0.33 | 0.20 |
| Composition from dehydrogenation, reaction zone (weight percent): | | | | |
| $C_3H_6$ | 23.9 | 23.5 | 15.8 | 16.8 |
| $C_2H_4$ | 17.1 | 15.8 | 5.7 | 4.9 |
| $CH_4$ | 11.1 | 8.7 | 3.3 | 2.8 |
| $C_2H_6$ | 2.4 | 1.8 | 0.3 | 0.2 |
| $C_3H_8$ | 8.0 | 10.1 | 25.6 | 15.1 |
| $CS_2$ | 3.1 | 3.1 | 4.9 | 8.2 |
| $H_2S$ | 18.4 | 19.8 | 25.0 | 27.7 |
| $CO$ | 0.7 | 0.7 | 0.3 | 0.4 |
| $CO_2$ | 0.6 | 0.5 | 0.3 | 0.3 |
| $H_2$ | 0.3 | 0.4 | Trace | Trace |
| $H_2O$ | 11.2 | 11.1 | 15.4 | 18.0 |
| Solid residue and other components | 3.2 | 4.5 | 3.4 | 5.6 |
| Per pass conversion, percent | 88 | 85 | 53 | 67 |
| Ultimate yield of $C_3H_6$, wt. percent | 41 | 43 | 55 | 56 |
| Ultimate yield of olefin, wt. percent | 70 | 71 | 75 | 76 |

It should be noted from the above data that under the conditions set forth for practicing this invention high conversion per pass may be obtained with yields of olefins exceeding 70% by weight where propylene is present in excess of 50% of the total yield of olefins. Moreover, under preferred reaction conditions, propylene may be obtained from the gaseous product, exiting from the dehydrogenation zone, as the prevailing product together with high yields of ethylene.

For a more complete comprehension of the invention, there is illustrated in the accompanying drawings a series of embodiments of the apparatus wherein:

FIG. 2 is an enlarged view of the adiabatic reactor shown in vertical cross-section to more clearly illustrate the construction and details of said reactor wherein the reaction takes place.

FIG. 3 is an end view of the adiabatic reactor shown in FIG. 2.

Figure 1:
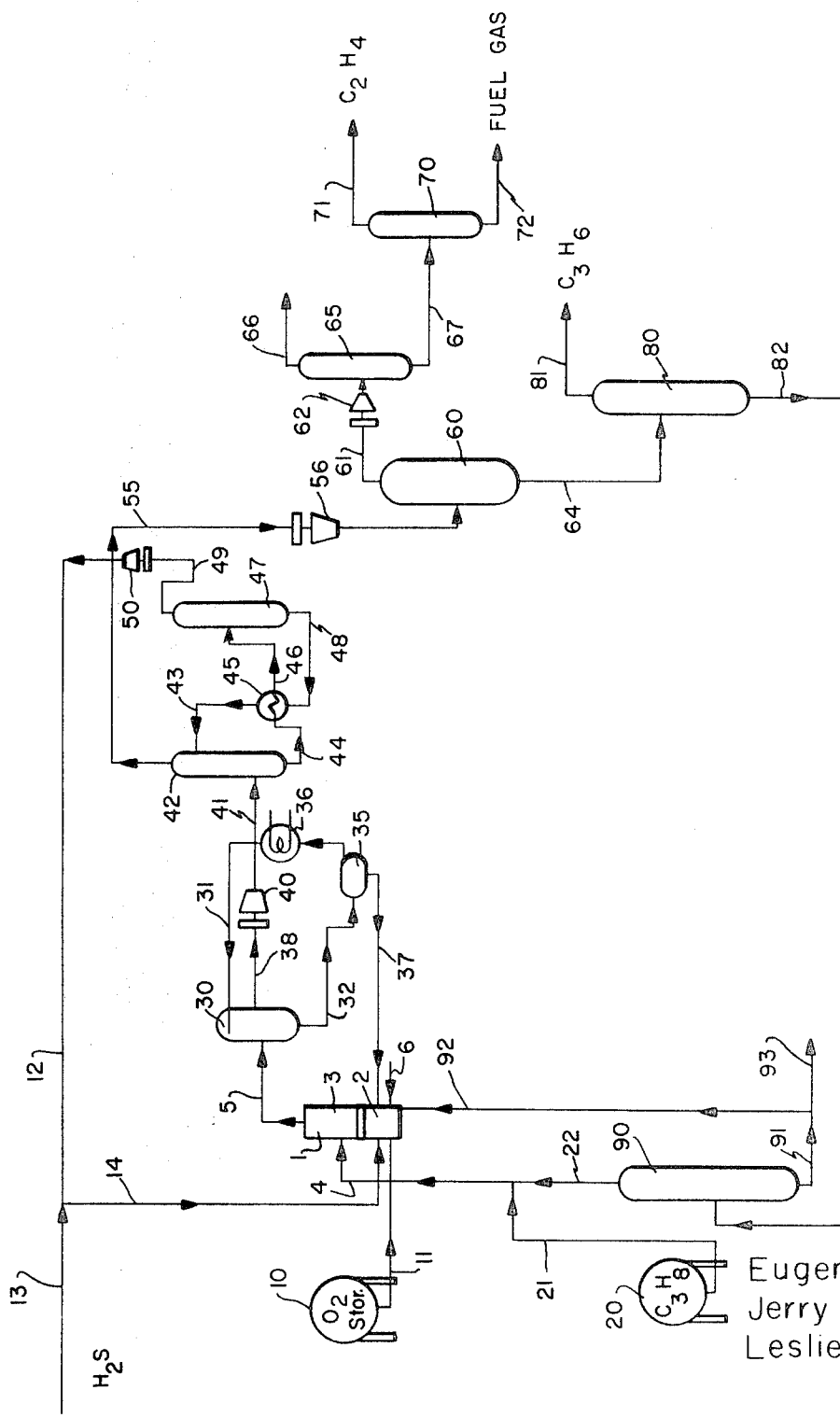
FIG. 1 is a schematic flow diagram of a plant wherein the process of this invention may take place.

Referring to FIG. 1, the adiabatic reactor 1 comprises essentially two zones, a combustion or oxidation-reaction zone 2 and a dehydrogenation-reaction zone 3. Oxygen and/or air either in the liquid or gaseous form is drawn from the storage vessel 10 through line 11 and fed to the oxidation-reaction zone 2 of the reactor 1. Hydrogen sulfide, for example, is recycled from line 12 and combined with makeup hydrogen sulfide, if needed, passing from line 13 and fed to the oxidation-reaction zone 2 of the reactor 1 through line 14. Combustion occurs in the oxidation-reaction zone 2 at pressures ranging from about 20 to 1500 p.s.i.a., preferably from 200 p.s.i.a. to 300 p.s.i.a. and at temperatures ranging from 3200° to 4500° F. The effluent from the oxidation-reaction zone 2 of the reactor 1 enters the dehydrogenation-reaction zone 3 where it is brought into contact with a light-hydrocarbon stream containing at least 50% by weight of propane through line 4. The hydrocarbon containing the propane is drawn from a storage tank 20 through line 21 where it is combined with any recycled propane passing through line 22 and fed to the dehydrogenation-reaction zone 3 of the reactor 1 through line 4.

The effluent from reactor 1 exits from the dehydrogenation-reaction zone 3 through line 5 and is quenched in quenching column 30 by contacting said effluent with water, carbon bisulfide, liquid hydrocarbons, or other suitable quench fluid fed through line 31. The liquid phase from the quench column 30 is removed through line 32 and carried to a separator 35. The quench fluid is returned from the separator 35 to the quench column 30 after having passed through the heat-exchanger 36.

The solid or insoluble sulfur compounds are removed from the separator 35 through line 37 and fed back to the oxidation-reaction zone 2 of the reactor 1 or treated externally to recover their sulfur values. The gaseous products passing from the reactor 1 and through the quench column 30 are removed through line 38 and compressed, if necessary, by compressor 40 before being fed through line 41 to the absorption column 42 of the amine unit.

In the absorber column 42 the gases are scrubbed by a counter flow of amine or other chemical equivalent to remove the acid gases including, for example, hydrogen sulfide, carbon dioxide, etc. The amine solution enters the absorber column 42 through lines 43 and is drawn off after absorbing the acid gases through line 44. The amine is in a heat-exchange relationship with the incoming amine in the heat-exchanger 45 carried on through line 46 to the stripping column 47. The amine, essentially free of said acid gases is then removed from the stripping column 47 through line 48 and recycled through heat-exchanger 45 and line 43 back to the absorber 42. The acid gases are recovered overhead through line 49 and compressed by compressor 50 before being recycled to the reactor through line 12.

The hydrocarbon stream containing the propane exiting from the absorber column 42 is drawn through line 55 and compressed, if necessary, by compressor 56 and then fed to the de-ethanizer column 60. The $C_2$ and lighter hydrocarbons are taken off overhead from the de-ethanizer 60 through line 61 and are compressed by compressor 62 and subsequently passed on to the demethanizer column 65. The overhead line 66 exiting from the demethanizer column 65 comprises fuel gas consisting essentially of methane, carbon monoxide and hydrogen. The bottoms exit from line 67 from the demethanizer column 65 and are forwarded to the $C_2$ splitter 70. Here ethylene is recovered from the overhead stream 71 while ethane is recovered from the bottoms through line 72 and may be utilized as a fuel gas. The bottoms from the de-ethanizer column 60 are carried through line 64 and fed to the $C_3$ splitting column 80. Here the product propylene is recovered overhead through line 81, while the bottoms are carried out through line 82 which may comprise propane, carbon disulfide, and other hydrocarbons containing four or more carbon atoms per molecule. The bottoms passing through line 82 are fed to the depropanizer column 90 where propane is recovered overhead through line 22 and recycled to the reactor 1 through line 4 into the dehydrogenation-reaction zone 3. The carbon disulfide and heavier hydrocarbons are withdrawn from the bottom through line 91 of the depropanizer column 90 and, if needed, are fed to the reactor 1 through line 92. Alternatively, the carbon disulfide and heavier hydrocarbons withdrawn through line 91 of the depropanizer column 90 may be fed to additional columns for separation through line 93 where separation takes place by conventional methods. A fuel gas, if necessary to maintain the proper heat balance, may be fed to the oxidation-reaction zone 2 of the reactor 1 through line 6. The fuel gas may be supplied from line 72 exiting from the $C_2$ splitter 70 and carried on through line 6 to the reactor 1.

As shown, FIG. 1 is a schematic view of a plant which may be designed to any desired size for purposes of carrying out the process of this invention. FIG. 2 illustrates a substantially adiabatic reactor 1 comprising an oxidation-reaction zone 2 and a dehydrogenation-reaction zone 3; said oxidation-reaction zone 2 having a cooling jacket 101 wherein a heat-transfer fluid e.g. water is circulated to control the temperature in the oxidation-reaction zone. The cooling jacket comprises an inlet 102 and an outlet 103 in communication with the jacket 101 which substantially covers the peripheral outer surface of the oxidation-reaction zone 2 of the reactor. The oxidation-reaction zone 2 has means 105 for supplying the oxygen-containing stream e.g. $O_2$ and means 104 and 106 for supplying the sulfur-containing compound e.g. hydrogen sulfide. Injectors introduce the reactants in a manner such that the mixing and reaction occurs in the oxidation-reaction zone 2. The inner surface of the oxidation-reaction zone 2 may be coated with materials capable of withstanding substantially high temperatures e.g. up to 4500° F. which reduced the amount of heat transferred to the coolant.

Ignition of the oxygen-containing stream and sulfur-containing compound may be accomplished by utilizing fluorine and other well-known gases or liquids which spontaneously ignite hydrogen sulfide, etc. These igniters may include, for example, chlorine trifluoride, bromine pentafluoride, etc., and are generally fed through the oxygen line 105 in amounts sufficient to spontaneously ignite the sulfur-containing compound e.g. hydrogen sulfide. In addition, other means of spontaneously igniting the sulfur-containing compound may be used and include, for example, heated metal plugs, a pilot flame or spark plugs, etc. These devices are critically placed to act as an ignition system for the combustible reactants which enter the oxidation-reaction zone 2 of the reactor. A collar 107 is circumferentially around the substantially cylindrical reactor 1 at a position down stream or near the end of the oxidation-reaction zone 2. The collar comprises a plurality of ports or openings 108 in alignment with openings in the reactor which permit a continuous feed of the hydrocarbon stream e.g. propane to the reactor 1 between the oxidation-reaction zone 2 and the dehydrogenation-reaction zone 3. The collar 107 has means 115 for carrying the light-hydrocarbon stream at specified flow rates to correspond with the flow rate of the oxygen entering the oxidation-reaction zone 2. The reactor 1 may have a plurality of flow-control means e.g. sonic nozzles 109 located just before or after the collar 107. The flow-control means adjust the pressure in the dehydrogenation zone 3 with the pressure in the oxidation-reaction zone 2. Similarly, a plurality of flow-control means 111 and 112 e.g. sonic nozzles may be positioned near the exit of the dehydrogenation zone 3 of the reactor 1. The dehydrogenation-reaction zone may be insulated either on its outer and/or its inner surface e.g. by insulating materials 110, which controls or maintains the reaction temperatures in the dehydrogenation zone. The adiabatic reactor 1 is generally cylindrical in shape to avoid any dead zones and may have a total length which ranges up to about 20 times its diameter. The volume may range from about $10^{-3}$ to about $10^3$ cubic feet per pound per second of combined flow of the oxygen-containing stream and the sulfur-containing compound entering the oxidation-reaction zone. As a typical example, the volume may range from about 0.1 to 0.01 cubic foot per pound per second of flow which provides a contact time of at least 0.001 second for the reaction to take place.

The reactor utilized in carrying out the process of this invention is considered to be comparatively low in cost, is substantially compact and operates essentially adiabatically by balancing the endothermic dehydrogenation reaction with the exothermic reaction of the hydrogen sulfide and oxygen. Thus, comparatively high yields of the olefins can be obtained by conducting the dehydrogenation of the hydrocarbon i.e. propane in an essentially adiabatic manner by feeding, for example, hydrogen sulfide, oxygen and propane or similar hydrocarbons to the reactor as described above.

As a variation, the above-described apparatus may be modified to comprise a plurality of reactors 1 wherein several oxidation-reaction units are combined with one or more dehydrogenation units so long as the mass flow of oxygen with respect to the amount of hydrocarbon are maintained within the prescribed limits. The reactor may be filled or partially filled with a catalyst and arranged as a fixed bed reactor or so that the reaction gases flow upward through a solid bed in such a configuration that the bed is fluidized.

If desirable, although it is not necessary, an inert gas e..g. nitrogen either alone or in combinations with other inert gases may be used as part of the reaction medium. The inert gas, for example, may be added either alone or in combination with the hydrocarbon stream to the dehydrogenation-reaction zone, and in some instances, if desirable, added with the oxygen-containing and/or sulfur compound streams being fed to the oxidation-reaction zone.

While this invention has been described with respect to a number of specific embodiments, it is obvious that there are other variations and modifications which can be used without departing from the spirit and scope of the invention as more particularly pointed out in the appended claims.

What is claimed is::

1. A continuous process for preparing an olefin product comprising a prevailing amount of propylene under substantially adiabatic conditions which comprises:
    (a) reacting in an oxidation-reaction zone an effective amount of at least one sulfur compound with an oxygen-containing stream at a ratio of about 0.2–1.0 part by weight of the oxygen in said oxygen-containing stream to 1.0 part by weight of said sulfur compound, at a temperature ranging from about 2500° F. to 4500° F., and at a pressure ranging from about 20 to 1500 p.s.i.a.; said sulfur compound being selected from the group consisting of hydrogen sulfide, mixtures of hydrogen sulfide with carbon disulfide and mixtures of hydrogen sulfide with a sulfur oxide wherein the hydrogen sulfide is present in said mixtures in an amount of at least 50% by weight;
    (b) passing the effluent containing the products obtained from said oxidation-reaction directly to a dehydrogenation zone wherein said reaction products are mixed with a light-hydrocarbon stream containing at least 50% by weight of propane and is substantially free of olefins and higher-molecular weight hydrocarbons having four or more carbon atoms per molecule;
    (c) said hydrocarbon stream being mixed with said oxidation-reaction products in the amount of about 0.05–1.5 parts by weight of the oxygen in said oxygen-containing stream added to the oxidation-reaction zone per 1.0 part by weight of propane in the hydrocarbon stream added to the dehydrogenation zone;
    (d) said effluent comprising the oxidation-reaction products being mixed with the hydrocarbon stream at temperatures ranging from about 1600° to 4500° F. for a contact time ranging from about 0.001 to 60 seconds, at pressures ranging from about 14 to 1400 p.s.i.a. while maintaining a temperature of at least 1000° F. in said dehydrogenation zone to obtain an effluent containing ethylene and propylene.

2. The process of claim 1 further characterized in that elemental sulfur is added to the sulfur compound in an amount ranging up to about 25% by weight of the mixture.

3. The process of claim 1 further characterized in that the oxidation-reaction products are mixed with the hydrocarbon stream at temperatures ranging from about 1600° to 4000° F. while the temperature throughout the dehydrogenation zone is maintained at temperatures ranging from about 1000° F. to 4500° F.

4. The process of claim 1 further characterized in that ethylene and propylene are continuously separated from the effluent passing from the dehydrogenation zone and substantially all of the remaining of the effluent is recycled.

5. A continuous process for preparing an olefin product comprising a prevailing amount of propylene under substantially adiabatic conditions which comprises:
    (a) reacting in an oxidation-reaction zone an effective amount of at least one sulfur compound with an oxygen-containing stream at a ratio of 0.2–1.0 part by weight of the oxygen in said oxygen-containing stream to 1.0 part by weight of the sulfur compound, at a temperature ranging from about 2500° F. to 4500° F., at a pressure ranging from about 20 to 1500 p.s.i.a., for a period ranging from about 0.001 to 0.1 second; said sulfur compound being selected from the group consisting of hydrogen sulfide, mixtures of hydrogen sulfide with carbon disulfide and mixtures of hydrogen sulfide with a sulfur oxide wherein the hydrogen sulfide is present in said mixtures in an amount of at least 50% by weight;
    (b) passing the effluent comprising the products obtained from said oxidation-reaction directly to a dehydrogenation zone wherein said reaction products are mixed with a light-hydrocarbon stream containing at least 50% by weight of propane and is substantially free of olefins and higher-molecular weight hydrocarbons having four or more carbon atoms;
    (c) said hydrocarbon stream being mixed with said oxidation-reaction products in the amount of about 0.05–1.5 parts by weight of oxygen in said oxygen-containing stream added to the oxidation-reaction zone per 1.0 part by weight of propane in said hydrocarbon stream added to the dehydrogenation zone;
    (d) said effluent comprising the oxidation-reaction products being mixed with the hydrocarbon stream at temperatures ranging from about 1600° to 4500° F. for a contact time ranging from about 0.001 to 60 seconds, at pressures ranging from about 14 to 1400 p.s.i.a. while maintaining a temperature of at least 1000° F. in said dehydrogenation zone to obtain an effluent containing ethylene and propylene.

6. The process of claim 5 further characterized in that ethylene and propylene are continuously separated from the effluent passing from the dehydrogenation zone and substantially all of the remaining of the effluent is recycled.

7. A continuous process for preparing an olefin product comprising a prevailing amount of propylene under substantially adiabatic conditions which comprises:
    (a) reacting in an oxidation-reaction zone an effective amount of at least one sulfur compound with an oxygen-containing stream at a ratio of 0.3–0.7 part by weight of the oxygen in said oxygen-containing stream to 1.0 by weight of the sulfur compound, at a temperature ranging from about 3200° F., to 3800° F., at a pressure ranging from about 60 to 1000 p.s.i.a., for a period ranging up to about 0.1 second; said sulfur compound being selected from the group consisting of hydrogen sulfide, mixtures of hydrogen sulfide with carbon disulfide and mixtures of hydrogen sulfide with a sulfur oxide wherein the hydrogen sulfide is present in said mixtures in a predominant amount;

(b) passing the effluent containing the products obtained from said oxidation-reaction directly to a dehydrogenation zone wherein said reaction products are mixed with a light-hydrocarbon stream containing a predominant amount of propane and is substantially free of diolefins and higher-molecular weight hydrocarbons having four or more carbon atoms;

(c) said hydrocarbon stream being mixed with said reaction products in an amount of about 0.1–0.8 part by weight of oxygen in said oxygen-containing stream per 1.0 part by weight of propane in said hydrocarbon stream, at temperatures ranging from about 1600° to 3800° F., at pressures ranging from about 150 to 400 p.s.i.a., for a contact time ranging from about 0.01 to 1.0 second while maintaining a temperature of at least 1000° F. in said dehydrogenation zone to obtain an effluent containing ethylene and propylene.

8. A continuous process for preparing an olefin product comprising a prevailing amount of propylene under substantially adiabatic conditions which comprises:

(a) reacting in an oxidation-reaction zone an effective amount of substantially pure hydrogen sulfide with oxygen at a ratio of about 0.2–0.6 part by weight of oxygen to 1.0 part by weight of the hydrogen sulfide, at a temperature ranging from about 3200° F. to 3800° F. and at a pressure ranging from about 200 to 600 p.s.i.a.;

(b) passing the effluent comprising the reaction products obtained from said oxidation-reaction directly to a dehydrogenation zone wherein said reaction products are mixed with substantially pure propane in an amount of about 0.1–0.8 part by weight of the oxygen entering the oxidation-reaction zone per 1.0 part by weight of the propane entering the dehydrogenation zone;

(c) said propane being mixed with the oxidation-reaction products at temperatures ranging from about 1600° to 3800° F., at pressures ranging from about 100 to 300 p.s.i.a., for a contact time ranging from about 0.01–0.5 second while maintaining a temperature of at least 1000° F. in said dehydrogenation zone to obtain an effluent containing ethylene and propylene.

9. The process of claim 8 further characterized in that ethylene and propylene are continuously separated from the effluent passing from the dehydrogenation zone with the remaining of the effluent being recycled.

10. The process of claim 8 further characterized in that the oxygen is a liquid and the hydrogen sulfide is a gas.

11. The process of claim 8 further characterized in that the oxygen is a gas and the hydrogen sulfide is a liquid.

12. The process of claim 1 further characterized in that the oxygen-containing stream is liquid oxygen and the sulfur compound is liquid hydrogen sulfide.

13. The process of claim 1 further characterized in that the light-hydrocarbon stream is a liquid.

14. The process of claim 1 further characterized in that the light-hydrocarbon stream is a gas.

15. A continuous process for preparing an olefin product comprising a prevailing amount of propylene under substantially adiabatic conditions which comprises:

(a) reacting in an oxidation-reaction zone an effective amount of hydrogen sulfide with substantially pure oxygen at a ratio of about 0.2–0.6 part by weight of the oxygen to 1.0 part by weight of the hydrogen sulfide, at a temperature ranging from about 3200° F. to 3800° F., and at a pressure ranging from about 200–600 p.s.i.a.;

(b) passing the effluent comprising the reaction products obtained from said oxidation-reaction directly to a dehydrogenation zone wherein said reaction products are mixed with a light-hydrocarbon stream consisting essentially of propane;

(c) said hydrocarbon stream being mixed with said oxidation-reaction products in an amount of about 0.1–0.8 part by weight of the oxygen added to the oxidation-reaction zone per 1.0 part by weight of the propane added to the dehydrogenation zone;

(d) said oxidation-reaction products being mixed with the hydrocarbon stream at temperatures ranging from about 1600° to 3800° F., at pressures ranging from about 150 to 400 p.s.i.a., and for a contact time ranging from about 0.01 to 1.0 second while maintaining the dehydrogenation zone at a temperature of at least 1000° F. to obtain an effluent containing ethylene and propylene.

16. The process of claim 15 further characterized in that ethylene and propylene are continuously separated from the effluent passing from the dehydrogenation zone and substantially all of the remaining of the effluent is recycled.

17. A continuous process for preparing an olefin product comprising a prevailing amount of propylene under substantially adiabatic conditions which comprises:

(a) reacting in an oxidation-reaction zone an effective amount of substantially pure hydrogen sulfide with oxygen at a ratio of about 0.2–0.6 part by weight of the oxygen to 1.0 part by weight of the hydrogen sulfide, at a temperature ranging from about 3200° F. to 4500° F., and at a pressure ranging from about 200 to 600 p.s.i.a.;

(b) passing the effluent comprising the reaction products obtained from said oxidation-reaction directly to a dehydrogenation zone wherein said reaction products are mixed with substantially pure propane; said propane being mixed with the oxidation-reaction products in the amount of at least 0.05 part by weight of the oxygen added to the oxidation reaction zone per 1.0 part by weight of the propane added to the dehydrogenation zone;

(c) said oxidation-reaction products being mixed with the propane at temperatures ranging from about 1600° to 4500° F., at pressures ranging from about 150 to 400 p.s.i.a., and for a contact time ranging from about 0.01–1.0 second while maintaining the dehydrogenation zone at a temperature of at least 1000° F. to obtain an effluent containing ethylene and propylene.

18. The process of claim 17 further characterized in that ethylene and propylene are continuously separated from the effluent passing from the dehydrogenation zone and substantially all of the remaining of the effluent is recycled.

19. The process of claim 17 further characterized in that the hydrogen sulfide and oxygen are reacted in the oxidation-reaction zone at a temperature ranging up to about 3800° F., at a pressure ranging from about 200 to 300 p.s.i.a., and for a period ranging from about 0.001 to 0.05 second.

20. The process of claim 19 further characterized in that the ratio of the oxygen to hydrogen sulfide in the oxidation-reaction zone ranges from about 0.4 to 0.5 part by weight of the oxygen to 1.0 part by weight of $H_2S$.

21. The process of claim 19 further characterized in that the propane is added to the dehydrogenation zone in an amount of approximately 0.1 to 0.8 part by weight of oxygen per 1.0 part by weight of propane.

22. A continuous process for preparing an olefin product comprising a prevailing amount of propylene under substantially adiabatic conditions which comprises:
 (a) reacting in an oxidation-reaction zone about 0.2–1.0 part by weight of substantially pure oxygen with 1.0 part by weight of substantially pure hydrogen sulfide, at a temperature ranging from about 3200° F. to 4000° F., and at a pressure ranging from about 200 to 600 p.s.i.a.;
 (b) passing the effluent comprising the reaction products obtained from said oxidation-reaction directly to a dehydrogenation zone wherein said reaction products are mixed with substantially pure propane in the ratio of approximately 0.1 to 0.8 part by weight of the oxygen added to the oxidation-reaction zone to 1.0 part by weight of the propane added to the dehydrogenation zone;
 (c) said propane being mixed with the oxidation-reaction products at temperatures ranging from about 2000° to 3800° F., at pressures ranging from about 150 to 400 p.s.i.a., and for a contact time ranging up to about 1.0 second while maintaining the dehydrogenation zone at a temperature of at least 1000° F. to obtain an effluent containing ethylene and propylene.

23. The process of claim 22 further characterized in that ethylene and propylene are continuously separated from the effluent passing from the dehydrogenation zone and substantially all of the remaining of the effluent is recycled.

24. The process of claim 22 further characterized in that the contact time in the dehydrogenation zone ranges from about 0.005 to 0.5 second.

25. The process of claim 22 further characterized in that oxygen is added to the oxidation-reaction zone in an amount of about 0.2–0.6 part by weight of oxygen to 1.0 part by weight of the propane added to the dehydrogenation zone.

26. The process of claim 22 further characterized in that the oxygen and hydrogen sulfide are gases.

27. The process of claim 1 further characterized in that the hydrocarbon stream containing the propane is mixed with the oxidation-reaction products in the dehydrogenation zone in the presence of an effective amount of catalyst.

28. The process of claim 27 further characterized in that the catalyst comprises a metal.

29. The process of claim 28 further characterized in that the metal is platinum.

30. The process of claim 27 further characterized in that the catalyst comprises a metal compound.

31. The process of claim 27 further characterized in that the catalyst is on a support.

32. The process of claim 31 further characterized in that the support is alumina and the catalyst comprises platinum.

33. The process of claim 27 further characterized in that the catalyst comprises nickel.

34. The process of claim 27 further characterized in that the catalyst comprises manganese.

35. The process of claim 27 further characterized in that the catalyst comprises cerium.

References Cited
UNITED STATES PATENTS

| | | | |
|---|---|---|---|
| 2,161,991 | 6/1939 | Baehr | 260—683.3 |
| 2,315,107 | 3/1943 | Chickinoff et al. | 260—683.3 |
| 2,941,021 | 6/1960 | Krause et al. | 260—683 |
| 3,116,343 | 12/1963 | Deisler | 260—683 |
| 3,178,488 | 4/1965 | Akin | 260—683 |
| 3,247,278 | 4/1966 | Garwood et al. | 260—683.3 |
| 3,329,735 | 7/1967 | Paul et al. | 260—683 |
| 3,403,192 | 9/1968 | Vadekar et al. | 260—683.3 |
| 3,047,371 | 7/1962 | Krause et al. | 23—277 |

DELBERT E. GANTZ, Primary Examiner

G. E. SCHMITKONS, Assistant Examiner

U.S. Cl. X.R.

23—277; 260—683